(12) United States Patent
Shoji et al.

(10) Patent No.: US 10,879,515 B2
(45) Date of Patent: Dec. 29, 2020

(54) BUS BAR MODULE

(71) Applicant: Yazaki Corporation, Tokyo (JP)

(72) Inventors: Takao Shoji, Shizuoka (JP); Shinichi Yanagihara, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 252 days.

(21) Appl. No.: 15/725,887

(22) Filed: Oct. 5, 2017

(65) Prior Publication Data

US 2018/0108898 A1 Apr. 19, 2018

(30) Foreign Application Priority Data

Oct. 17, 2016 (JP) .................................. 2016-203621

(51) Int. Cl.
H01M 2/20 (2006.01)
H01M 2/10 (2006.01)
(Continued)

(52) U.S. Cl.
CPC ......... *H01M 2/206* (2013.01); *H01M 2/1077* (2013.01); *H01M 10/425* (2013.01);
(Continued)

(58) Field of Classification Search
CPC .. H01M 2/206; H01M 10/482; H01M 10/425; H01M 10/48; H01M 2/1077; H01M 2220/20
See application file for complete search history.

(56) References Cited

U.S. PATENT DOCUMENTS 7,955,729 B2 6/2011 Onuki et al.
9,023,499 B2 5/2015 Takase et al.
(Continued)

FOREIGN PATENT DOCUMENTS

CN 101141008 A 3/2008
CN 103443961 A 12/2013
(Continued)

OTHER PUBLICATIONS

Japanese Office Action for the related Japanese Patent Application No. 2016-203621 dated Nov. 20, 2018.
(Continued)

*Primary Examiner* — Lisa S Park
(74) *Attorney, Agent, or Firm* — Kenealy Vaidya LLP

(57) ABSTRACT

A bus bar module includes a plurality of bus bars, a plate-shaped housing case, and a plurality of voltage detection conductors. Each of the bus bars is connected to two or more electrode terminals in an electrode terminal group. The housing case has a plurality of bus bar housing spaces housing the respective bus bars, and has insulation property. The voltage detection conductors are each connected to the bus bars. The bus bars are each disposed in the bus bar housing spaces while separated from the inner peripheral surfaces forming the bus bar housing spaces. The housing case includes a pair of support connecting sections that support the corresponding bus bar with respect to the housing case, in each of the bus bar housing spaces. Each of the support connecting sections has elastic deformation sections allowing elastic deformation in an arrangement direction.

6 Claims, 4 Drawing Sheets

(51) Int. Cl.
*H01M 10/42* (2006.01)
*H01M 10/48* (2006.01)

(52) U.S. Cl.
CPC ......... *H01M 10/48* (2013.01); *H01M 10/482* (2013.01); *H01M 2220/20* (2013.01)

(56) References Cited

U.S. PATENT DOCUMENTS

| | | |
|---|---|---|
| 9,083,095 B2 | 7/2015 | Takase et al. |
| 9,705,161 B2 | 7/2017 | Nishihara et al. |
| 9,780,351 B2 | 10/2017 | Shimoda et al. |
| 2008/0057393 A1* | 3/2008 | Onuki ................. H01M 2/1022 429/159 |
| 2012/0328920 A1 | 12/2012 | Takase et al. |
| 2013/0280959 A1* | 10/2013 | Takase ................ H01M 2/1077 439/627 |
| 2014/0017533 A1 | 1/2014 | Nishihara et al. |
| 2016/0254515 A1 | 9/2016 | Shimoda et al. |
| 2017/0223827 A1 | 8/2017 | Yamada et al. |

FOREIGN PATENT DOCUMENTS

| | | |
|---|---|---|
| JP | 2009-289429 A | 12/2009 |
| JP | 2011-210711 A | 10/2011 |
| JP | 2012-164477 A | 8/2012 |
| JP | 2012-174507 A | 9/2012 |
| JP | 2013-4186 A | 1/2013 |
| JP | 2014-232633 A | 12/2014 |
| JP | 5648610 B2 | 1/2015 |
| JP | 2015-49931 A | 3/2015 |
| JP | 2015-111537 A | 6/2015 |
| JP | 2016-85930 A | 5/2016 |
| WO | 2012/131809 A1 | 10/2012 |

OTHER PUBLICATIONS

Japanese Office Action for the related Japanese Patent Application No. 2016-203621 dated Mar. 5, 2019.

* cited by examiner

150# BUS BAR MODULE

CROSS-REFERENCE TO RELATED APPLICATION(S)

The present application claims priority to and incorporates by reference the entire contents of Japanese Patent Application No. 2016-203621 filed in Japan on Oct. 17, 2016.

BACKGROUND OF THE INVENTION

1. Field of the Invention

The present invention relates to a bus bar module.

2. Description of the Related Art

There has been a bus bar module used for a battery module that is formed by connecting a plurality of battery cells in series. The bus bar module includes a plurality of bus bars that connect adjacent battery cells in series, a housing case in which housing spaces for housing the respective bus bars are formed, and a voltage detection lines that are each connected to the bus bars (refer to Japanese Patent No. 5648610). In each of the voltage detection lines, one end part is connected to a bus bar, and the other end part is connected to, for example, an electric control unit (ECU) mounted on a vehicle through a connector, and is used for charge control and the like of a battery module by outputting voltage information on a battery cell to which each of bus bars is connected.

In assembling a bus bar module, bus bars are housed in respective housing spaces, and it requires to check whether each of the bus bars is held in a housing case. Thus, there has been room for improvement in easy workability.

SUMMARY OF THE INVENTION

In view of the foregoing, an object of the present invention is to provide a bus bar module capable of improving easy workability at the time of assembling.

In order to achieve the above mentioned object, a bus bar module according to one aspect of the present invention includes a plurality of bus bars that are each connected to two or more electrode terminals in an electrode terminal group arranged in a row in a battery module formed of a plurality of battery cells; a plate-shaped housing case that has a plurality of bus bar housing spaces housing the respective bus bars, and has insulation property; and a plurality of voltage detection conductors that are each connected to the bus bars, wherein the bus bars are each disposed in the bus bar housing spaces in a separated state where the bus bars being separated from inner peripheral surfaces forming the bus bar housing spaces, the housing case includes at least one support connecting section corresponding to each of the bus bar housing spaces, the support connecting section connecting the housing case and the bus bars to each other and supporting the bus bars with respect to the housing case, and the support connecting section has an elastic deformation section that allows elastic deformation at least in an arrangement direction and is integrally formed with the housing case and the corresponding bus bar.

According to another aspect of the present invention, in the bus bar module, it is preferable that the voltage detection conductors serve as a printing circuit body deposited on a surface of the housing case.

According to still another aspect of the present invention, in the bus bar module, it is preferable to further include a circuit board that receives voltage information from the voltage detection conductors, wherein the housing case has a board housing space housing the circuit board, and has a pair of first connectors attached thereto, the pair of first connectors facing each other with the board housing space interposed therebetween and connected to the voltage detection conductors, respectively, and the circuit board is disposed in the board housing space in a separated state where the circuit board being separated from inner peripheral surfaces forming the board housing space, and is provided with a pair of second connectors engaged with the pair of first connectors.

According to still another aspect of the present invention, in the bus bar module, it is preferable that the second connectors are inserted into the first connectors in an insertion direction in which the circuit board is inserted into the board housing space, and the circuit board is supported with respect to the housing case in a engaged state where the first connectors and the second connectors are engaged with each other.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

An embodiment according to the present invention will now be described with reference to the accompanying drawings. It should be noted that the embodiment below is not intended to limit this invention. Components in the embodiment include components that can be replaced and facilitated by the skilled person or that are substantially like components.

Embodiment

Figure 1:
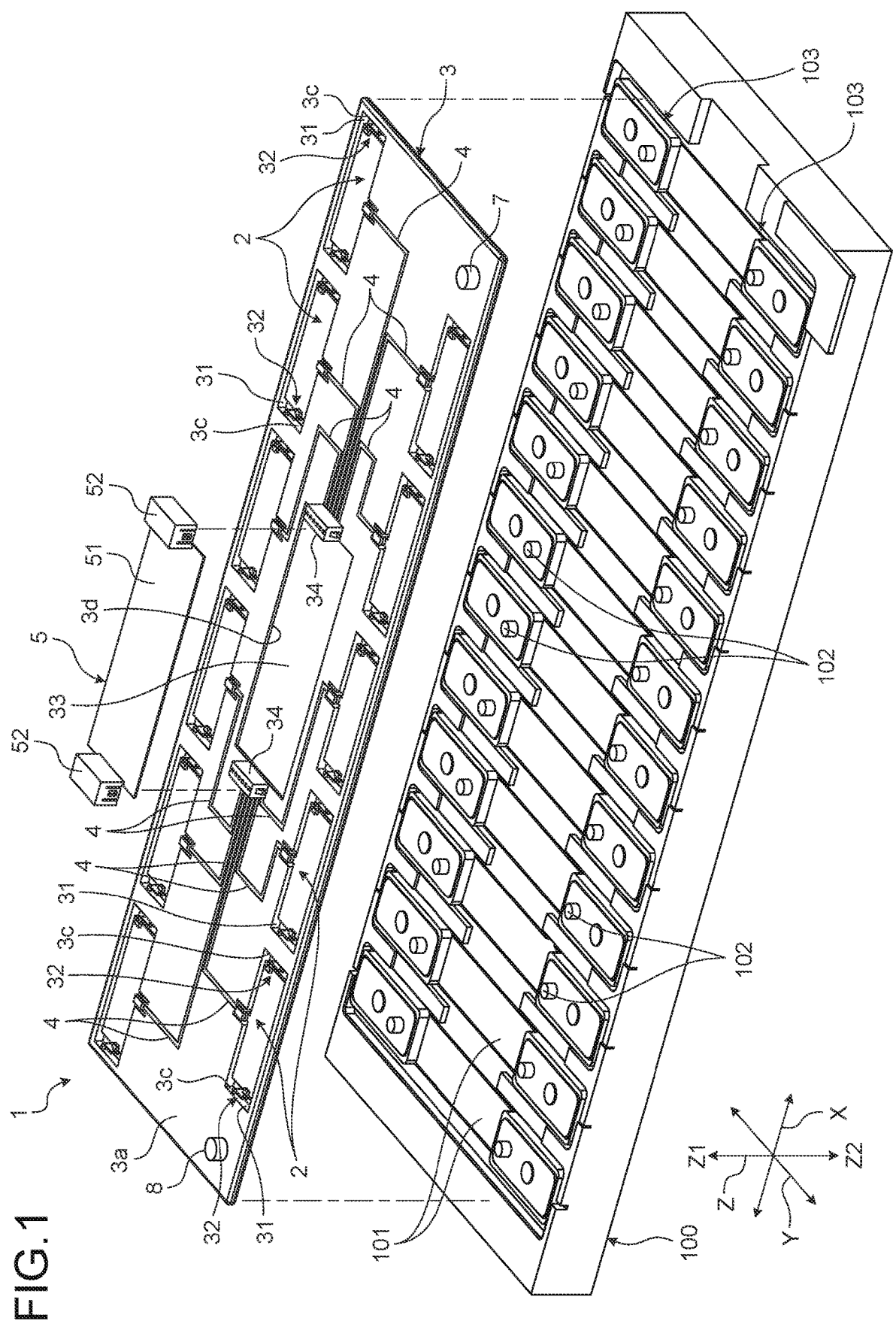
FIG. 1 is an exploded perspective view illustrating a battery module that includes a bus bar module in accordance with an embodiment.
Figure 2:
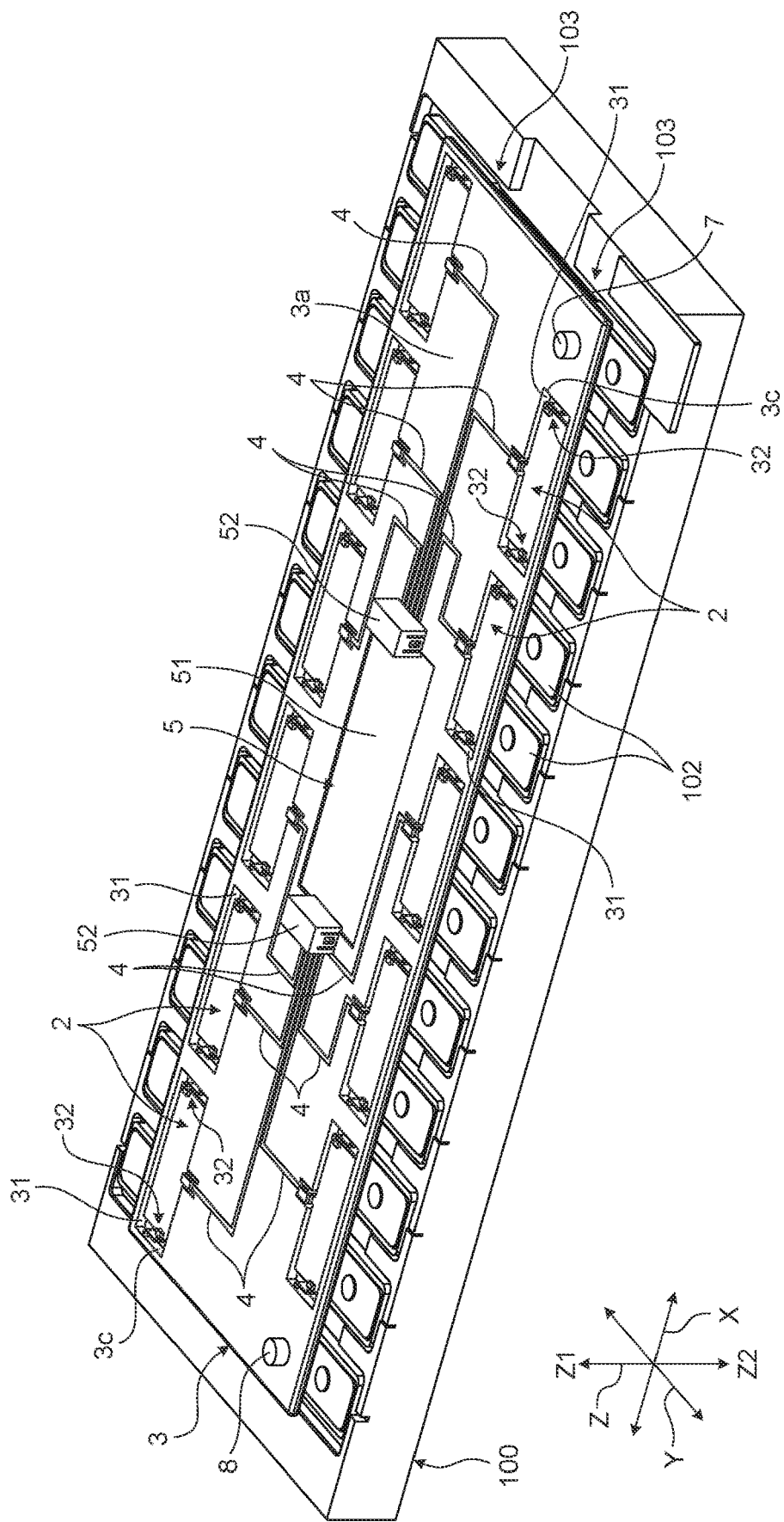
FIG. 2 is a perspective view illustrating the battery module to which the bus bar module according to the embodiment is assembled.
Figure 3:
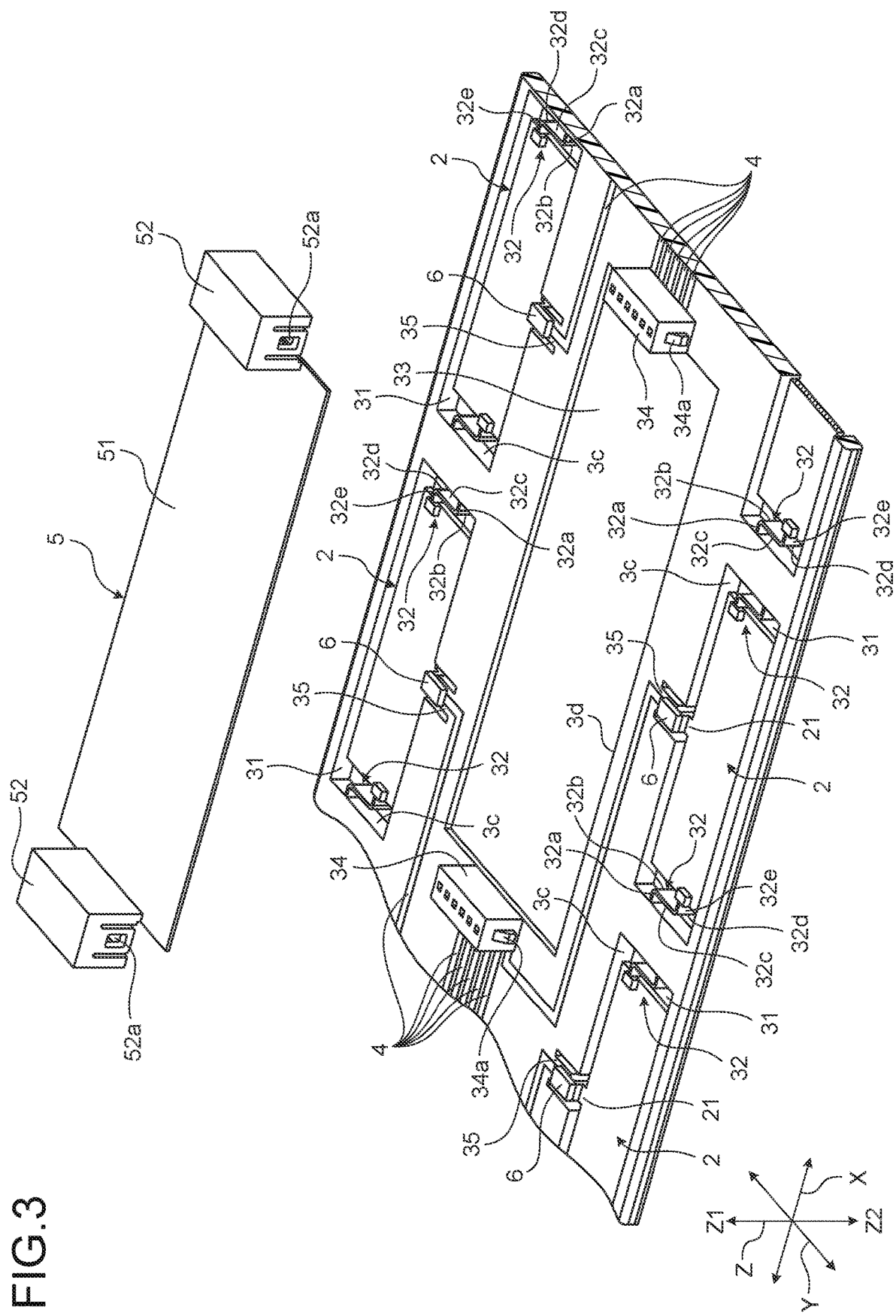
FIG. 3 is a perspective view illustrating the bus bar module according to the embodiment.
Figure 4:
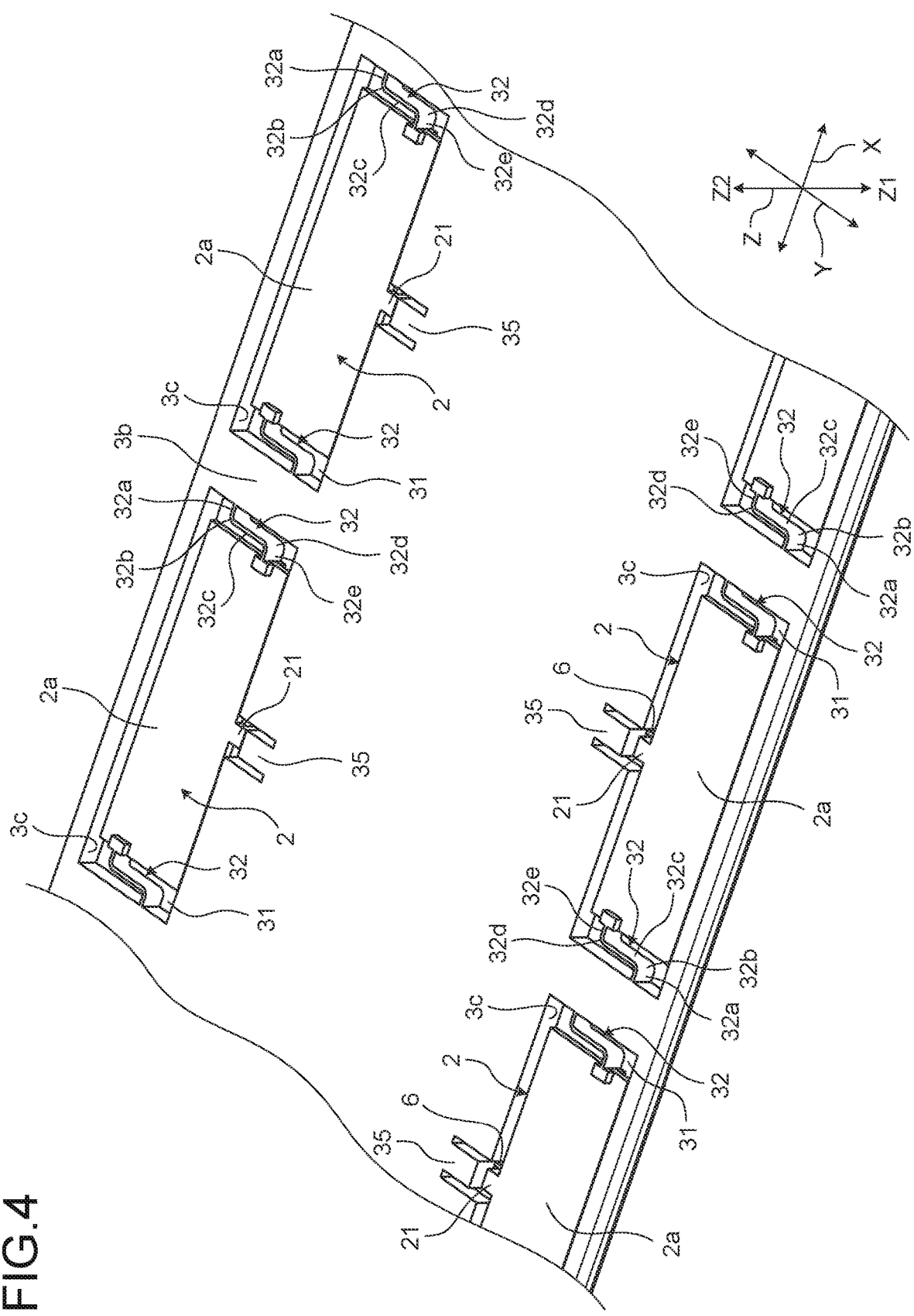
FIG. 4 is a perspective view illustrating the bus bar module according to the embodiment.

FIG. 1 is an exploded perspective view illustrating a battery module that includes a bus bar module in accordance with an embodiment. FIG. 2 is a perspective view illustrating the battery module to which the bus bar module according to the embodiment is assembled. FIG. 3 is a perspective view illustrating the bus bar module according to the embodiment. FIG. 4 is a perspective view illustrating the bus bar module according to the embodiment. FIG. 3 is a view illustrating a housing case viewed from a surface, and FIG. 4 is a view illustrating the housing case viewed from a rear surface. An X direction in each of the drawings indicates an arrangement direction of electrode terminals and bus bars according to the embodiment. A Y direction indicates a width direction of a bus bar module according to the embodiment, and a direction orthogonal to the arrangement direction. A Z direction indicates a vertical direction of the bus bar module, and a direction orthogonal to the arrangement direction and the width direction. A Z1 direction is an upper direction of the bus bar module, and a Z2 direction is a lower direction opposite to the upper direction.

As illustrated in FIG. 1, a bus bar module 1 according to the embodiment is assembled to a battery module 100. The battery module 100 is formed by arranging a plurality of battery cells 101, for example, secondary batteries in the arrangement direction and modularizing them. The battery module 100 is mounted on, for example, electric vehicles (EVs), hybrid vehicles (HVs), and plug-in hybrid vehicles (PHVs), and is used for supplying power to a rotating electrical machine serving as a drive source and storing (charging) power generated by the rotating electrical machine. For example, a power-supply apparatus can obtain high battery output depending on output required for a vehicle by connecting a plurality of batteries in series. Each of the battery cells 101 includes a pair of electrode terminals 102 (a positive electrode terminal and a negative electrode terminal) on both end parts in the width direction, and an electrode terminal group 103 that is formed of the plurality of electrode terminals 102 arranged in the arrangement direction in the battery module 100 is separated in the width direction and is formed in two rows. In the battery module 100, the bus bar module 1 is assembled to the electrode terminal groups 103, and the electrode terminals 102 (positive electrode terminals and negative electrode terminals) of the battery cells 101 are connected in series by the bus bar module 1, thereby obtaining high output depending on output required for an unillustrated vehicle on which the battery module 100 is mounted. The battery cells 101 according to the embodiment are disposed so that the electrode terminals 102 adjacent in the arrangement direction of the battery cells 101 adjacent in the arrangement direction have different poles.

The bus bar module 1 is used for connecting the battery cells 101 in series, and includes a plurality of bus bars 2, a housing case 3, a plurality of voltage detection conductors 4, a circuit board 5, a connector 6, and a pair of terminal electrodes 7 and 8 as illustrated in FIGS. 1 and 2. The bus bar module 1 may output voltage information on the battery cells 101 connected to each of the bus bars 2 through the voltage detection conductors 4 to the outside. The voltage information is input into an unillustrated electric control unit (ECU) mounted on a vehicle through the circuit board 5, and is used for charging and discharging control of the battery module 100 based on the acquired voltage information.

As illustrated in FIGS. 1 to 4, each of the bus bars 2 is connected to two or more electrode terminals 102 of the electrode terminal group 103 arranged in a row, and is housed in the housing case 3. The bus bar 2 according to the embodiment electrically connects two electrode terminals 102 and 102 with different poles adjacent in the arrangement direction forming one of the electrode terminal groups 103 out of the two electrode terminal groups 103 and 103 separated in the width direction of the battery cells 101 adjacent in the arrangement direction. The bus bar 2 is formed in a flat plate shape by a material having conductivity such as metal, and is, when seen from the vertical direction in the embodiment, formed in a rectangular plate shape having the arrangement direction as a longitudinal direction. The bus bar 2 has a projection piece 21 connected to the voltage detection conductor 4. The projection piece 21 according to the embodiment is formed on one end part out of both end parts in the width direction, projecting from a center part in the arrangement direction to one side in the width direction (center part in the width direction of the housing case 3). The bus bar 2 according to the embodiment has the adjacent electrode terminals 102 connected to a rear surface 2a that is a surface on a lower side. Each of the bus bars 2 is housed in a bus bar housing space 31, which will be described later, of the housing case 3, and has a longitudinal direction parallel to the arrangement direction, and is arranged in a row in the arrangement direction corresponding to each electrode terminal group.

As illustrated in FIGS. 1 to 4, the housing case 3 houses the bus bars 2 and has bus bar housing spaces 31 corresponding to the bus bars 2. The housing case 3 is formed of, for example, a material such as a synthetic resin, has insulation property, and is formed in a plate shape, more specifically, in a rectangular plate shape having the arrangement direction as the longitudinal direction when seen from the vertical direction in the embodiment. The housing case 3 includes the bus bar housing spaces 31, support connecting sections 32, a board housing space 33, first connectors 34, and projection pieces 35.

Each of the bus bar housing spaces 31 houses the bus bar 2, and is formed by facing the electrode terminals 102 of the two electrode terminal groups 103 and 103 in the vertical direction, being separated from each other in the width direction with respect to the housing case 3, and being arranged in a row in the arrangement direction. The bus bar housing space 31 according to the embodiment penetrates through the housing case 3 from a surface 3a to a rear surface 3b, and is formed in a rectangle having the arrangement direction as the longitudinal direction when seen from the vertical direction. When seen from the vertical direction, the bus bar housing space 31 is formed so that outer peripheral surfaces of the bus bar 2 on which the bus bar housing space 31 is disposed and inner peripheral surfaces 3c of the housing case 3 that forms the bus bar housing space 31 are separated from each other. In other words, the bus bar 2 is disposed in the bus bar housing space 31 while being separated from the inner peripheral surfaces 3c forming the bus bar housing space 31.

The support connecting sections 32 connect the housing case 3 to the bus bar 2, and support the bus bar 2 with respect to the housing case 3. At least a pair of support connecting sections 32 is formed with respect to the bus bar housing space 31 in the housing case 3, and, in the embodiment, the pair of support connecting sections 32 is formed with the bus bar 2 interposed therebetween. When seen from the vertical direction, each of the support connecting sections 32 is formed in an S shape, and is formed in a plate shape extending in the vertical direction in a state where no external force is applied on the support connecting section 32. The support connecting section 32 is formed so that the support connecting section 32 does not project from the bus bar housing space 31 in the vertical direction, and includes a case connector 32a, a first bending portion 32b, a width direction connector 32c, a second bending portion 32d, and a bus bar connector 32e. The case connector 32a is formed projecting from a part facing the bus bar 2 in the arrangement direction on the inner peripheral surfaces 3c toward a direction directed to the bus bar 2 in the arrangement direction, and is connected to the first bending portion 32b. The first bending portion 32b is an elastic deformation portion that allows elastic deformation in the arrangement direction, and is curved when seen from the vertical direction. The first bending portion 32b is a portion where the support connecting section 32 is bent from the arrangement direction to the width direction, and is connected to the case connector 32a and the width direction connector 32c. The width direction connector 32c is connected to the first bending portion 32b and the second bending portion 32d, and is formed along the width direction. The second bending portion 32d is an elastic deformation section, and is curved when seen from the vertical direction. The second bending portion 32d is a part where the support connecting section 32 is bent from the arrangement direction to the width direction, and is connected to the width direction connector 32c and the bus bar connector 32e. The bus bar connector 32e extends from the second bending portion 32d toward a direction directed to the bus bar 2 in the arrangement direction, is formed in a U shape having an aperture on the bus bar 2 side when seen from the width direction, and is formed with the bus bar 2 interposed therebetween in the vertical direction. In other words, the support connecting section 32 supports the bus bar 2 with respect to the housing case 3 through the bus bar connector 32e. The pair of support connecting sections 32 and 32 is formed in the same shape when seen from the vertical direction.

The support connecting section 32 is integrally formed with the housing case 3 and the bus bar 2. In the bus bar module 1 according to the embodiment, by integrally forming the bus bar 2 with the housing case 3, the support connecting section 32 is integrally formed with the housing case 3 and the bus bar 2. A method for integrally forming the bus bar 2 with the housing case 3 is implemented using a well-known method, and is implemented by, for example, insert molding. By preliminarily disposing each of the bus bars 2 in an area where the bus bar housing space 31 is formed with respect to a molding metal mold that molds the housing case 3, and injecting a material forming the housing case 3 in the molding metal mold, the bus bar 2 can be interposed between the bus bar connectors 32e of the support connecting section 32 at the time of molding the housing case 3 including the support connecting section 32.

The board housing space 33 houses the circuit board 5. The board housing space 33 according to the embodiment penetrates through the housing case 3 from a surface 3a to the rear surface 3b, and is formed in the center part of the housing case 3 and in a rectangle having the arrangement direction as the longitudinal direction when seen from the vertical direction. When seen from the vertical direction, the board housing space 33 is formed so that outer peripheral surfaces of the circuit board 5 on which the board housing space 33 is disposed and inner peripheral surfaces 3d of the housing case 3 that forms the board housing space 33 are separated from each other. In other words, the circuit board 5 is disposed in the board housing space 33 while being separated from the inner peripheral surfaces 3d forming the board housing space 33.

The first connector 34 has each of the voltage detection conductors 4 connected thereto, and the pair of first connectors 34 and 34 is formed with respect to the board housing space 33. The pair of first connectors 34 and 34 is engaged with a pair of second connectors 52 and 52 of the circuit board 5, which will be described later, and supports the circuit board 5 in the board housing space 33 while being engaged with the pair of second connectors 52 and 52. The pair of first connectors 34 and 34 according to the embodiment is attached to the surface 3a of the housing case 3 with the board housing space 33 interposed therebetween in the arrangement direction. Out of the pair of first connectors 34 and 34, one first connector 34 in the arrangement direction is connected to the voltage detection conductors 4 (one voltage detection conductor group) formed on one side in the arrangement direction on the surface 3a of the housing case 3, and the other first connector 34 is connected to the voltage detection conductors 4 (the other voltage detection conductor group) formed on the other side in the arrangement direction on the surface 3a of the housing case 3. Each of the first connectors 34 includes therein a first terminal electrically connected to the voltage detection conductors 4, and has locking claws 34a formed on both end parts in the width direction.

Each of the projection pieces 35 projects from a notch formed on the inner peripheral surfaces 3c toward the bus bar housing space 31 in the housing case 3 forming the bus bar housing space 31. The projection piece 35 according to the embodiment is formed corresponding to the bus bar housing space 31, and is formed projecting from the notch communicating with the bus bar housing space 31 that is formed directed to a center part in the width direction to an end part in the width direction. The projection piece 35 is a part where one end of the voltage detection conductor 4 formed on the surface 3a of the housing case 3 is formed. The projection piece 35 faces the projection piece 21 of the bus bar 2 disposed in the bus bar housing space 31 in the width direction.

The voltage detection conductors 4 are connected to each of the bus bars 2, and form two voltage detection conductor groups with the board housing space 33 interposed therebetween in the arrangement direction. In the voltage detection conductors 4 according to the embodiment, one end part is electrically connected to the bus bar 2, and the other end part is electrically connected to the circuit board 5 through the first connector 34 and the second connector 52. The voltage detection conductors 4 are electrically connected to the projection piece 21 of the bus bar 2 through the connector 6 at the projection piece 35. The connector 6 is a connector having conductivity such as conductive paste, solder, conductive rubber, and welding, and preferably has a following property for relative movement of the bus bar 2 in the arrangement direction with respect to the housing case 3.

The voltage detection conductors 4 are integrally formed with the housing case 3. The voltage detection conductors 4 according to the embodiment serve as a printing circuit body (also referred to as a printed circuit body), and are deposited on a surface of the housing case 3 so as to be integrally formed with the housing case 3. The voltage detection conductors 4 are, for example, resin to which metal particles having conductivity are added, are formed by a dispenser, and are deposited on a surface of the housing case 3. In other words, the voltage detection conductors 4 according to the embodiment are directly deposited on the housing case 3. Forming the voltage detection conductors 4 by the dispenser is executed by a drawing apparatus including the dispenser and a stage corresponding to the dispenser. The dispenser discharges a material of the voltage detection conductors 4 that is filled therein on the housing case 3, and deposits the material on the surface 3a. The dispenser includes a filling unit that fills a material of the voltage detection conductors 4, and a nozzle communicating with the filling unit and with the outside of the dispenser. The stage includes a fixing mechanism for fixing the housing case 3. The dispenser and the stage are connected to a controller. In the controller, mapping information on circuit drawing corresponding to the shape of the voltage detection conductors 4 is defined, and the controller relatively moves the dispenser and the stage based on the mapping information. The dispenser or the stage can move in three axis directions orthogonal to one another. When an operator operates the drawing apparatus, the dispenser discharges a filled material from the tip of the nozzle on the surface 3a of the housing case 3. At the same time, the dispenser or the stage moves based on the mapping information defined in the controller. As described above, the voltage detection conductors 4 are deposited (or printed) on the surface 3a of the housing case 3.

The circuit board 5 receives voltage information from the voltage detection conductors 4, and outputs the voltage information to the ECU. The circuit board 5 includes a board body 51 and the second connectors 52. The board body 51 has unillustrated print wiring and electronic components provided thereto and has the pair of second connectors 52 provided on both end parts in the arrangement direction. The pair of second connectors 52 is engaged with the pair of first connectors 34. Each of the second connectors 52 includes an unillustrated aperture on a lower side, and each of the first connectors 34 is inserted from the aperture into the inside of the second connector 52. Thus, the second connector 52 is, with respect to the first connector 34, inserted into the first connector 34 in an insertion direction in which the circuit board 5 is inserted with respect to the board housing space 33, in other words, in a lower direction. The second connector 52 corresponds to the first terminal of the first connector 34, includes therein a second terminal that is electrically connected to the first terminal in an engagement state, and has locking receiving units 52a formed on both end parts in the width direction. The locking receiving units 52a are units into which the locking claws 34a of the first connector 34 inserted into the second connector 52 are inserted. The locking receiving units 52a are engaged by being hooked and locked on the locking claws 34a of the first connector 34 and restricting the second connector 52 from moving toward an upper direction with respect to the first connector 34. In other words, the circuit board 5 is, while the first connector 34 and the second connector 52 are engaged with each other, supported with respect to the housing case 3, and is supported in the vertical direction in the embodiment.

The pair of terminal electrodes 8 and 7 connects the battery cells 101 connected in series in the battery module 100 to an external electronic device. The pair of terminal electrodes 7 and 8 is a metal member having conductivity. In the embodiment, the terminal electrode 8 is a positive terminal electrode and the terminal electrode 7 is a negative terminal electrode, and they are integrally formed with the housing case 3.

The following describes assembling of the bus bar module 1 to the battery module 100. Each of the bus bars 2 is disposed in the corresponding bus bar housing space 31 through the pair of support connecting sections, and is housed in the housing case 3. Each of the voltage detection conductors 4 is preliminarily formed as a printing circuit body in the housing case 3, and one end part of the voltage detection conductor 4 is connected to the bus bar 2, and the other end part is connected to the first connector 34. First, an operator attaches the bus bar module 1 to the battery module 100. An operator aligns a longitudinal direction of the housing case 3 with the arrangement direction of the battery cells 101, and places the bus bar module 1 on the battery module 100 so that each of the bus bars 2 faces the electrode terminals 102 and 102 adjacent in the vertical direction. In this processing, the tip of each of the adjacent electrode terminals 102 and 102 contacts the rear surface 2a of the bus bar 2. The pair of terminal electrodes 7 and 8 contacts the facing electrode terminals 102 in the vertical direction. Next, an operator electrically connects each of the bus bars 2 and the adjacent electrode terminals 102 and 102 to each other.

In the embodiment, the electrode terminals 102 and 102 are electrically connected to the rear surface 2a of the bus bar 2 by laser welding and soldering. Similarly, an operator electrically connects the pair of terminal electrodes 8 and 7 and the electrode terminals 102 to each other. Next, an operator attaches the circuit board 5 to the housing case 3. An operator inserts the pair of second connectors 52 into the pair of first connectors 34 in a lower direction, thereby making the pair of second connectors 52 and the pair of first connectors 34 engaged with each other and housing the circuit board 5 in the board housing space 33.

As described above, in the bus bar module 1, each of the bus bars 2 is integrally formed with the housing case 3. Thus, housing the bus bars 2 in the housing case 3 is no longer required at the time of assembling the bus bar module, and easy workability at the time of assembling can be improved. In addition, a time for housing the bus bars 2 in the housing case 3 is no longer required at the time of assembling the bus bar module 1 to the battery module 100, and a time for assembling the bus bar module 1 to the battery module 100 can be shortened. The bus bars 2 are integrally formed with the housing case 3, and the bus bars 2 can be prevented from falling off from the housing case 3.

At the time of charging and discharging the battery module 100, the battery cells 101 repeat expansion and contraction in the arrangement direction in a case of the battery module 100. In the embodiment, a gap is formed between each of the bus bars 2 and each of the bus bar housing spaces 31. When the bus bars 2 are about to relatively move with respect to the housing case 3 in the arrangement direction due to expansion and contraction of the battery cells 101 in the arrangement direction, the bending degree of the first bending portions 32b and the second bending portions 32d is changed due to elastic deformation, and the width direction connectors 32c cross the width direction so as to change the size of the gap between the bus bars 2 and the housing case in the width direction. Thus, the support connecting sections 32 enables the housing case 3 to follow the relative movement of the bus bars 2 to which the electrode terminals 102 are connected, and can absorb the movement of the bus bars 2 caused by expansion and contraction of the battery cells 101 in the arrangement direction in the housing case 3. Thus, the housing case 3 has a plate shape and can reduce length in the vertical direction, in other words, thickness as compared with a case where the bus bar housing spaces 31 housing the respective bus bars 2 are formed with a frame body and the like, and the height of the battery module 100 can be reduced.

In the bus bar module 1, the voltage detection conductors 4 are preliminarily integrally formed with the housing case 3 as a printing circuit body. Thus, wiring the voltage detection conductors 4 to the housing case 3 is no longer required at the time of assembling the bus bar module 1, and easy workability at the time of assembling can be improved. In addition, a time for wiring the voltage detection conductors 4 to the housing case 3 is no longer required at the time of assembling the bus bar module 1 to the battery module 100, and a time for assembling the bus bar module 1 to the battery module 100 can be shortened. Because the voltage detection conductors 4 serve as a printing circuit body, the weight of the bus bar module 1 can be reduced as compared with a case where electric wire in which a conductor is covered by an insulating body is used as a voltage detection conductor. In addition, problems such as disconnection and tangling generated on electric wire in which a conductor is covered by an insulating body can be solved, and a load on a connection part with the bus bars 2 due to pulling at the time of wiring can be reduced.

While housed in the board housing space 33 of the housing case 3, the circuit board 5 can be connected to each of the voltage detection conductors 4 through the first connectors 34 and the second connectors 52. Thus, an increase in size of the bus bar module 1 can be reduced as compared with a case where a board case housing the circuit board 5 is attached to the housing case 3. In addition, since the circuit board 5 is housed in the board housing space 33 of the housing case 3, the height of the battery module 100 can be reduced.

While the first connectors 34 and the second connectors 52 are engaged with each other, the circuit board 5 is supported by the housing case 3 through the pair of first connectors 34 and 34, and the pair of second connectors 52 and 52. Thus, separately providing a support mechanism and a supporting unit for supporting the circuit board 5 in the board housing space 33 is no longer required. With a simple configuration, the circuit board 5 can be attached to the housing case 3.

The pair of support connecting sections 32 according to the embodiment is formed in the arrangement direction, but is not limited thereto. The pair of support connecting sections 32 may be formed in the width direction, and a pair may be formed in the arrangement direction and another pair in the width direction. The number of support connecting sections 32 may be one. In each of the support connecting sections 32, an elastic deformation section that allows elastic deformation in the arrangement direction only needs to be formed, and is not limited to be formed in a curved shape when seen from the vertical direction. For example, the support connecting section 32 may have a flat plate shape when seen in the vertical direction, and may include a part as an elastic deformation section that has a smaller cross section as compared with the other parts in the support connecting section 32 and further facilitates elastic deformation than the other parts. The pair of terminal electrodes 7 and 8 according to the embodiment is integrally formed with the housing case 3, but is not limited thereto. The pair of terminal electrodes 7 and 8 may be electrically connected to the electrode terminals 102 through fixtures separately from the housing case 3.

The bus bar module according to the present embodiment can improve easy workability at the time of assembling the bus bar module because each bus bar is integrally formed with a housing case and housing the bus bar in the housing case is no longer required at the time of assembling.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bus bar module comprising:
   a plurality of bus bars that are each connected to two or more electrode terminals in an electrode terminal group arranged in a row in a battery module formed of a plurality of battery cells;
   a plate-shaped housing case that has a plurality of bus bar housing spaces housing the respective bus bars, and has insulation property; and
   a plurality of voltage detection conductors that are each connected to the bus bars, wherein
   the bus bars are each disposed in the bus bar housing spaces in a separated state where the bus bars are separated from inner peripheral surfaces forming the bus bar housing spaces,
   the housing case includes at least one support connecting section corresponding to each of the bus bar housing spaces, the support connecting section connecting the housing case and the bus bars to each other and supporting the bus bars with respect to the housing case,
   the support connecting section has an elastic deformation section that allows elastic deformation at least in an arrangement direction and is directly joined to both the housing case and the corresponding bus bar,
   the support connecting section extends between a corresponding one of the inner peripheral surfaces and the corresponding bus bar such that each of the bus bars are separated from the inner peripheral surfaces.

2. The bus bar module according to claim 1, wherein the voltage detection conductors serve as a printed circuit body deposited on a surface of the housing case.

3. The bus bar module according to claim 2, further comprising:
   a circuit board that receives voltage information from the voltage detection conductors, wherein
   the housing case has a board housing space housing the circuit board, and has a pair of first connectors attached thereto, the pair of first connectors facing each other with the board housing space interposed therebetween and connected to the voltage detection conductors, respectively, and
   the circuit board is disposed in the board housing space in a separated state where the circuit board are separated from inner peripheral surfaces forming the board housing space, and is provided with a pair of second connectors engaged with the pair of first connectors.

4. The bus bar module according to claim 3, wherein the second connectors are inserted into the first connectors in an insertion direction in which the circuit board is inserted into the board housing space, and
   the circuit board is supported with respect to the housing case in an engaged state where the first connectors and the second connectors are engaged with each other.

5. The bus bar module according to claim 1, wherein the elastic deformation section is spaced away from each of the corresponding bus bar and the inner peripheral surface.

6. The bus bar module according to claim 1, wherein the support connecting section includes a case connector and a bus bar connector, the case connector is connected to and extends from the corresponding one of the inner peripheral surfaces, and the bus bar connector is connected to and extends from the bus bar, and
   the elastic deformation section is located between the case connector and the bus bar connector.

* * * * *